US012773587B2

(12) United States Patent
Friday et al.

(10) Patent No.: US 12,773,587 B2
(45) Date of Patent: Oct. 27, 2026

(54) CEILING-ONLY FIRE PROTECTION SPRINKLER SYSTEM FOR A STORAGE AREA HAVING A CONFIGURATION OF RACK STORAGE OR FLOOR STORAGE

(71) Applicant: The Reliable Automatic Sprinkler Co. Inc., Liberty, SC (US)

(72) Inventors: Phillip Friday, Liberty, SC (US); Juan Jimenez, Liberty, SC (US); Steven Wolin, Clemson, SC (US)

(73) Assignee: The Reliable Automatic Sprinkler Co. Inc., Liberty, SC (US)

( * ) Notice: Subject to any disclaimer, the term of this patent is extended or adjusted under 35 U.S.C. 154(b) by 84 days.

(21) Appl. No.: 18/405,651

(22) Filed: Jan. 5, 2024

(65) Prior Publication Data

US 2024/0226627 A1 Jul. 11, 2024

Related U.S. Application Data

(60) Provisional application No. 63/478,835, filed on Jan. 6, 2023.

(51) Int. Cl.
*A62C 35/68* (2006.01)
*A62C 3/00* (2006.01)

(52) U.S. Cl.
CPC .............. *A62C 35/68* (2013.01); *A62C 3/002* (2013.01)

(58) Field of Classification Search
CPC ......... A62C 35/68; A62C 3/002; B05B 1/265; B05B 1/262
See application file for complete search history.

(56) References Cited

U.S. PATENT DOCUMENTS 6,450,265 B1 9/2002 Ponte
6,715,561 B2 4/2004 Franson
7,165,624 B1 1/2007 Fischer
7,314,093 B2 1/2008 Orr
(Continued)

FOREIGN PATENT DOCUMENTS

WO 2022/178179 A1 8/2022

OTHER PUBLICATIONS

FM Global "Property Loss Prevention Data Sheet 8-9", Mar. 2010 (103 pages).
(Continued)

*Primary Examiner* — Steven M Sutherland
(74) *Attorney, Agent, or Firm* — Venable LLP

(57) ABSTRACT

A ceiling-only fire protection sprinkler system for a storage area having a storage height up to forty-three feet (thirteen and one tenth meters) and a ceiling height exceeding forty-five feet (thirteen and seven tenths meters). The storage area includes floor storage or rack storage that has aisle widths less than six feet (one and eight tenths meters) and transverse flue spaces less than six inches (one hundred fifty millimeters). The system includes fire suppression sprinklers that each includes a deflector positioned at a height that is at least three feet (nine tenths meters) greater than the storage height and at least one foot (three tenths meters) below the ceiling. Activated sprinklers have a coverage area greater than sixty-four square feet (five and nine tenths square meters) and up to one hundred square feet (nine and three tenths square meters) per each activated sprinkler.

15 Claims, 8 Drawing Sheets

(56) References Cited

U.S. PATENT DOCUMENTS

| | | | |
|---|---|---|---|
| 7,343,980 B2 | | 3/2008 | Pahila |
| 7,584,803 B2 | | 9/2009 | Ballard |
| 7,624,812 B2 | | 12/2009 | Pahila |
| 7,730,959 B2 | | 6/2010 | Fischer |
| 7,735,570 B2 | | 6/2010 | Fischer |
| 7,766,091 B2 | | 8/2010 | Fischer |
| 8,172,001 B2 | | 5/2012 | Tow et al. |
| 8,176,988 B2 | | 5/2012 | Fischer |
| 8,186,448 B2 | | 5/2012 | Fischer |
| 8,485,270 B2 | | 7/2013 | Fischer |
| 8,714,274 B2 | | 5/2014 | Golinveaux et al. |
| 8,925,641 B1 | | 1/2015 | Fischer |
| 9,320,928 B2 | | 4/2016 | Golinveaux et al. |
| 9,457,213 B2 | * | 10/2016 | Miller ..................... B05B 1/265 |
| 9,573,007 B2 | | 2/2017 | Abels et al. |
| 9,604,084 B2 | | 3/2017 | Kadoche |
| 9,682,263 B2 | | 6/2017 | Kadoche |
| 9,717,936 B2 | | 8/2017 | Ancone et al. |
| 9,833,649 B2 | | 12/2017 | Abels et al. |
| 10,143,873 B2 | | 12/2018 | Pahila et al. |
| 10,532,236 B2 | | 1/2020 | Pahila |
| 10,661,107 B2 | | 5/2020 | Workman et al. |
| 10,709,914 B1 | | 7/2020 | Workman et al. |
| 10,729,924 B1 | | 8/2020 | Workman et al. |
| 10,751,556 B2 | | 8/2020 | Workman et al. |
| 10,773,110 B2 | | 9/2020 | Workman et al. |
| 10,780,303 B2 | | 9/2020 | Workman et al. |
| 10,960,244 B2 | | 3/2021 | Magnone et al. |
| 11,007,388 B2 | | 5/2021 | Workman et al. |
| 11,213,707 B2 | | 1/2022 | Wancho |
| 11,324,977 B2 | | 5/2022 | Magnone et al. |
| 11,324,980 B2 | | 5/2022 | Koiwa |
| 11,400,330 B2 | | 8/2022 | Wancho |
| 2011/0036598 A1 | | 2/2011 | Pahila |
| 2019/0262645 A1 | * | 8/2019 | Pahila ..................... B05B 1/262 |
| 2021/0052925 A1 | | 2/2021 | Workman et al. |
| 2021/0077841 A1 | | 3/2021 | Magnone et al. |
| 2021/0094051 A1 | | 4/2021 | Koiwa |
| 2021/0101038 A1 | | 4/2021 | Oldham et al. |
| 2021/0128960 A1 | | 5/2021 | Pahila |
| 2021/0252322 A1 | | 8/2021 | Wancho |
| 2022/0008772 A1 | | 1/2022 | Wancho |
| 2022/0226681 A1 | | 7/2022 | Magnone et al. |
| 2022/0296944 A1 | | 9/2022 | Silva, Jr. |
| 2022/0331632 A1 | | 10/2022 | Coelho et al. |
| 2022/0401774 A1 | | 12/2022 | Golinveaux |

OTHER PUBLICATIONS

"Approval Standard for Quick Response Storage Sprinklers for Fire Protection", Class No. 2008, Feb. 2018 (87 pages).

UL 199, "Automatic Sprinklers for Fire-Protection Service", Standard for Safety, 12th Edition, Apr. 28, 2020 (179 pages).

"Technical Data Sheet: MX8514 ESFR Pendent Sprinkler K28.0." Minimax. Retrieved on May 16, 2024, from: https://www.minimax-fire.com/sites/default/files/2019-07/FX_010715.pdf.

"VK514—ESFR Pendent Sprinkler (K28)" Viking. Retrieved on May 16, 2024, from: https://www.vikinggroupinc.com/products/early-suppression-fast-response-esfr/vk514-esfr-pendent-sprinkler-k28.

International Search Report and Written Opinion of the ISA issued in International Application No. PCT/US2024/010504, dated Mar. 26, 2024 (14 pages).

* cited by examiner

CEILING-ONLY FIRE PROTECTION SPRINKLER SYSTEM FOR A STORAGE AREA HAVING A CONFIGURATION OF RACK STORAGE OR FLOOR STORAGE

CROSS-REFERENCE TO RELATED APPLICATION

This application claims priority to U.S. Provisional Application No. 63/478,835, filed Jan. 6, 2023, the entire contents of which is hereby incorporated by reference.

FIELD OF THE INVENTION

The present invention relates generally to storage fire protection sprinklers used in high density storage buildings and warehouses.

BACKGROUND

The expansion of e-commerce and online ordering have led to significant changes to how warehouses are built and utilized. Whereas traditional warehouses were generally designed and operated to store various materials to replenish brick-and-mortar stores and manufacturing processes, new direct-to-customer fulfillment centers are being located, designed and operated to allow for rapid direct delivery to consumers. Efficiency demands that these new fulfillment warehouses maximize the use of available space. Consumer products are being stored higher and more densely than in the past. This is accomplished by a combination of (1) taller storage racks, (2) narrower picking aisles between storage racks, and (3) units of storage (pallets, bin boxes, etc.) closer together in the racks. Higher volume and higher density storage in these facilities has created the need for novel fire protection sprinklers and fire protection sprinkler system configurations to ensure these facilities are adequately protected while remaining operationally efficient.

A number of codes and standards exist that dictate fire protection sprinkler requirements for storage facilities. One standard is "NFPA 13: Standard for the Installation of Sprinkler Systems" (2022 edition) ("NFPA 13"). NFPA 13 is published by the National Fire Protection Association and is an industry consensus standard. Another standard is FM Global Property Loss Prevention Data Sheet 8-9 ("FM 8-9"). FM 8-9 is published by FM Global, an industrial property risk insurance company specializing in the "highly protected risk" category. FM 8-9 is a 'guide' containing recommendations that may be considered best practices. FM 8-9 is not a code and its guidelines are not regulatory requirements. Another organization that maintains standards related to fire protection sprinklers and fire protection sprinkler systems is UL Solutions ("UL"). "UL" is considered a Nationally Recognized Testing Laboratory ("NRTL") and publishes standards for fire protection sprinklers. Of particular interest is UL 199, "Automatic Sprinklers for Fire-Protection Service", 12$^{th}$ Edition, Apr. 28, 2020. UL is also considered a 'listing agency' as it performs product certifications and publishes a list of products that are certified according to its requirements. Similarly, FM Approvals LLC ("FM Approvals") also maintains standards related to fire protection sprinklers and fire protection sprinkler systems. FM Approvals is considered a NRTL and publishes standards for fire protection sprinklers, including, "Approval Standard for Quick Response Storage Sprinklers for Fire Protection, Class Number 2008," February 2018.

Both NFPA 13 and FM 8-9 provide installation and protection guidelines for storage fire protection sprinkler systems. These guidelines establish how the fire hazard of different materials and storage configurations are to be addressed. Stored materials are classified according to the combustibility of the materials themselves and the packaging of those materials. This is defined collectively as 'commodity classification'. Commodity classifications are divided into two major groups: ordinary materials and materials containing a significant amount of plastics. Commodity classifications currently recognized by NFPA 13 and FM 8-9, listed in order from least combustible, or hazardous, to most combustible, or hazardous, are as follows: Class I, Class II, Class III, Class IV, and Group A Plastics. Class I commodities are essentially non-combustible products that may be placed on a wood pallet, shrink wrapped or in a single-layer corrugated carton (e.g., steel angle iron on a wood pallet). Class II commodities are non-combustible products that are stored in combustible packaging materials such as wooden crates or boxes, multi-layered corrugated cartons and may or may not be placed on a wooden pallet. Class III commodities are products made from wood, paper, natural fibers and may or may not be placed in a carton, box, or crate, and may or may not be placed on a wooden pallet. Class IV commodities contain limited percentage of plastics. Group A plastics are considered the most hazardous of the commodity classifications excluding high hazard materials (e.g., rubber tires, flammable and combustible liquids, oxidizers, aerosols, etc.). Group A plastics are further subdivided according to whether materials are stored in cardboard cartons or 'exposed' (i.e., not in cardboard or wood cartons) and whether the plastic material is expanded through the introduction of gas pockets with the material structure, e.g. like many foam insulation and packaging materials, or non-expanded. The four subclassifications of Group A plastics in order from least combustible, or hazardous, to most combustible, or hazardous, are as follows: cartoned unexpanded plastics (CUP), cartoned expanded plastics (CEP), exposed unexpanded plastics (EUP), and exposed expanded plastics (EEP).

Typical storage arrangements of materials or products include: palletized storage, solid piled storage, shelf storage, bin box storage, and rack storage. Palletized storage is defined by NFPA 13 as, "[s]torage of commodities on pallets or other storage aids that form horizontal spaces between tiers of storage." Palletized storage has the advantage of not requiring racking or other material storage system, but has the disadvantage of limited storage height due to stability concerns and the inability to remove pallet loads below the top level of the palletized storage stack without removing the pallet loads above. Solid piled storage is defined by NFPA 13 as "[s]torage of commodities stacked on each other." Shelf storage is defined by NFPA 13 as, "[s]torage on structures up to and including 30 in. (750 mm) deep and separated by aisles at least 30 in. (750 mm) wide." Bin Box storage is defined by NFPA 13 as, "[s]torage in five-sided wood, metal, or cardboard boxes with open face on the aisles in which boxes are self-supporting or supported by a structure so designed that little or no horizontal or vertical space exists around boxes." Rack is defined in NFPA 13 as, "[a]ny combination of vertical, horizontal, or diagonal members that supports stored materials."

Where materials are stored in excess of 12 feet high, the storage is considered "high-piled". High-piled storage in open frame racks is the most challenging storage configuration addressed. Fire protection sprinkler systems capable of protecting Group A plastics stored in racks are also capable of protecting lesser hazardous commodity classifications in other less challenging storage arrangements, such as floor storage arrangements (i.e., palletized, solid-piled, shelf, and bin box storage).

Rack storage is characterized as being in single-row, double-row, or multiple-row. NFPA 13 defines single-row racks as, "[r]acks that have no longitudinal flue space and that have a depth up to 6 ft (1.8 m) with aisles having a width of at least 3.5 ft (1.1 m) between loads on racks." NFPA 13 defines double-row racks as, "[r]acks less than or equal to 12 ft (3.7 m) in depth or single-row racks placed back to back having an aggregate depth up to 12 ft (3.7 m), with aisles having an aisle width of at least 3.5 ft (1.1 m) between loads on racks." Further, NFPA 13 defines multiple-row racks as, "[r]acks greater than 12 ft (3.7 m) in depth or single- or double-row racks separated by aisles less than 3.5 ft (1.1 m) wide having an overall width greater than 12 ft (3.7 m)."

Racks may be further defined as "open racks", such open racks having flue spaces maintained between storage loads. Flue spaces allow hot gasses from a fire near the base of the storage rack to reach sprinklers near the ceiling level and water discharged from sprinklers located near the ceiling level to reach a fire at the base of the rack. Flue spaces are defined as either "transverse", which are parallel to the direction of loading, or "longitudinal", which are perpendicular to the direction of loading and do not exceed 24 inches (600 mm) between storage loads. Such transverse flue spaces are required by NFPA 13 to be, "[n]ominal 6 in. (150 mm) transverse flue spaces between loads and at rack uprights shall be maintained in single-row, double-row, and multiple-row racks."

Similarly, Section 2.2.3.2 of FM 8-9 requires certain flue spaces to be maintained in open racks, known as open-frame racks, such requirements for transverse flue spaces depending on the types of rack, whether the flue spaces are aligned vertically, and, in some cases, the minimum width of the longitudinal flue spaces. FM 8-9 requires open-frame multiple-row racks to have a minimum of 6 inch (150 mm) net wide transverse flue spaces a maximum of every 5 feet (1.5 m) horizontally. For single-row open-racks, FM 8-9 requires, "[r]acks void of any misaligned transverse flue spaces throughout the entire height of the rack [to] have minimum 3 in. (75 mm) net wide transverse flue spaces a maximum of every 4½ ft (1.4 m)." Where single-row open-racks void of misaligned transverse flue spaces throughout the entire height of the rack have minimum 6-inch (150 mm) net wide transverse flue spaces, the transverse flue spaces may be spaced up to a maximum of 9 feet (2.7 m) apart. Where single-row open racks with misaligned transverse flue spaces are present, minimum 6-inch (150 mm) net wide transverse flue spaces that are vertically aligned throughout the entire height of storage must be provided a maximum of every 4.5 feet (1.4 m) horizontally. For double-row open-racks, the requirements for transverse flue spaces in FM 8-9 depend on whether misaligned flue spaces are present as well as the minimum width of the longitudinal flue spaces. Where the width of the longitudinal flue spaces is a minimum of 6 inches (150 mm) and the racks are void of misaligned flue spaces, transverse flue spaces with a minimum width of 3 inches (75 mm) must be provided at intervals not exceeding 5 feet (1.5 m) horizontally. Where the width of longitudinal flue spaces is a minimum of 3 inches (75 mm) and the racks are void of misaligned flue spaces, transverse flue spaces with a minimum width of 3 inches (75 mm) must be provided at intervals not exceeding 4.5 feet (1.4 m) horizontally or transverse flue spaces with a minimum width of 6 inches must be provided at intervals not exceeding 9 feet (2.7 m) horizontally. For double-row open-racks with misaligned flue spaces and longitudinal flue spaces with a minimum width of 3 inch (75 mm), transverse flue spaces with a minimum width of 6 inches (150 mm) must be provided at intervals not exceeding 4.5 feet (1.4 m) horizontally.

While the presence of flue spaces between storage loads are necessary to allow certain fire sprinkler systems to suppress or control a fire, the flue spaces comprise portions of the building that are not used for storage of commodity. The presence of flue spaces between storage loads reduces the number of storage loads that may be stored in a building compared with a building having fewer or small flue spaces.

Aisles may be present between storage racks to allow for loading and unloading of storage loads. Aisles may also be used as fire breaks to help prevent the spread of fire between racks. Fire sprinkler system designs may be based on maintaining certain minimum aisle widths between racks. For example, The Reliable Automatic Sprinkler Co. Inc. Model HL22 sprinkler has a nominal K-factor of 22.4 gpm/psi$^{1/2}$ (320 L/min/bar$^{1/2}$) and is cULus Listed for the protection of storage of Class I through IV and CUP commodity stored up to 43 feet (13.1 m) high in open racks under a ceiling up to 48 feet (14.6 m) above the floor, where the sprinkler has a temperature rating of 212° F.)(100° C., when a flowing water pressure of 55 psi (3.8 bar), sprinklers installed with the deflector no more than 14 inches (350 mm) below the ceiling, and aisles with a minimum width between single-row or double-row racks of 8 feet (2.4 m) are maintained.

The Tyco Model ESFR-25 sprinkler has a nominal K-factor of 25.2 gpm/psi$^{1/2}$ (360 L/min/bar$^{1/2}$) and is cULus Listed for the protection of storage of Class I through IV and CUP commodity stored up to 43 feet (13.1 m) high in open racks under a ceiling up to 48 feet (14.6 m) above the floor, where the sprinkler has a temperature rating of 165° F. (74° C.) or 212° F.) (100° C., when a flowing water pressure of 45 psi (3.1 bar), sprinklers installed with the deflector no more than 14 inches (350 mm) below the ceiling, and aisles with a minimum width between single-row or double-row racks of 5 feet (1.5 m) are maintained.

The Viking Corporation Model VK514 sprinkler has a nominal K-factor of 28.0 gpm/psi$^{1/2}$ (400 L/min/bar$^{1/2}$) and is cULus Listed for the protection of storage of Class I through IV and CUP commodity stored up to 43 feet (13.1 m) high in open racks under a ceiling up to 48 feet (14.6 m) above the floor, where the sprinkler has a temperature rating of 165° F. (74° C.) or 212° F.)(100° C., when a flowing water pressure of 35 psi (2.4 bar), sprinklers installed with the deflector no more than 14 inches (350 mm) below the ceiling, and aisles with a minimum width between single-row or double-row racks of 6 feet (1.8 m) are maintained.

The Victaulic Corporation Model V4802 and V4804 sprinklers have a nominal K-factor of 25.2 gpm/psi$^{1/2}$ (360 L/min/bar$^{1/2}$) and are cULus Listed for the protection of storage of Class I through IV and CUP commodity stored up to 43 feet (13.1 m) high in open racks under a ceiling up to 48 feet (14.6 m) above the floor, where the sprinkler has a temperature rating of 155° F. (68° C.) or 165° F. (74° C.), when a flowing water pressure of 45 psi (3.1 bar) and aisles with a minimum width between single-row or double-row racks of 4 feet (1.2 m) are maintained. The Victaulic Corporation Model V4802 and V4804 sprinklers are also cULus Listed for the protection of storage of Class I through IV and cartoned, unexpanded Group A plastic commodity stored up to 43 feet (13.1 m) high in open racks under a ceiling up to 48 feet (14.6 m) above the floor, where the sprinkler has a temperature rating of 200° F.). (93° C. or 212° F. (100° C.), when a flowing water pressure of 45 psi (3.1 bar), sprinklers installed with the deflector no more than 14 inches (350 mm) below the ceiling, and aisles with a minimum width between single-row or double-row racks of 5 feet (1.5 m) are maintained.

FM 8-9 includes design criteria for FM Approved quick-response storage sprinklers to protect storage of Class I through IV and CUP commodity under ceiling heights exceeding 40 feet (12.0 m) in Table 17b. Such design criteria include protection of storage under ceiling heights up to 50 feet (15.2 m) and up to 55 feet (16.8 m). For sprinklers having a nominal K-factor of 22.4 gpm/psi$^{1/2}$ (320 L/min/bar$^{1/2}$) protecting storage under ceilings not exceeding 50 feet (15.2 m) above the floor, the design includes a minimum flowing pressure of 63 psi (4.3 bar), sprinklers installed with the thermal element no more than 13 inches (325 mm) below the ceiling, and requires aisles between storage racks having a minimum width of 6 feet (1.8 m). For sprinklers having a nominal K-factor of 25.2 gpm/psi$^{1/2}$ (360 L/min/bar$^{1/2}$) protecting storage under ceilings not exceeding 50 feet (15.2 m) above the floor, the design includes a minimum flowing pressure of 50 psi (3.5 bar) where the sprinklers are installed with the thermal element no more than 13 inches (325 mm) below the ceiling and 75 psi (5.2 bar) where the sprinklers are installed with the thermal element no more than 17 inches (425 mm) below the ceiling, with aisles between storage racks having a minimum width of 6 feet (1.8 m). For sprinklers having a nominal K-factor of 28.0 gpm/psi$^{1/2}$ (400 L/min/bar$^{1/2}$) protecting storage under ceilings not exceeding 50 feet (15.2 m) above the floor, the design includes a minimum flowing pressure of 40 psi (2.8 bar), sprinklers installed with the thermal element no more than 13 inches (325 mm) below the ceiling, and requires aisles between storage racks having a minimum width of 6 feet (1.8 m). For sprinklers having a nominal K-factor of 33.6 gpm/psi$^{1/2}$ (480 L/min/bar$^{1/2}$) protecting storage under ceilings not exceeding 50 feet (15.2 m) above the floor, the design includes a minimum flowing pressure of 55 psi (3.8 bar), sprinklers installed with the thermal element no more than 17 inches (425 mm) below the ceiling, and requires aisles between storage racks having a minimum width of 6 feet (1.8 m).

Table 17b of FM 8-9 also includes design criteria for protection of storage of Class I through IV or CUP commodity under ceilings not exceeding 55 feet (16.8 m) above the floor. For sprinklers having a nominal K-factor of 28.0 gpm/psi$^{1/2}$ (400 L/min/bar$^{1/2}$) protecting storage under ceilings not exceeding 55 feet (16.8 m) above the floor, the design includes a minimum flowing pressure of 80 psi (5.5 bar), sprinklers installed with the thermal element no more than 13 inches (325 mm) below the ceiling, and requires aisles between storage racks having a minimum width of 8 feet (2.4 m). For sprinklers having a nominal K-factor of 33.6 gpm/psi$^{1/2}$ (480 L/min/bar$^{1/2}$) protecting storage under ceilings not exceeding 55 feet (16.8 m) above the floor, the design includes a minimum flowing pressure of 55 psi (3.8 bar), sprinklers installed with the thermal element no more than 17 inches (425 mm) below the ceiling, and requires aisles between storage racks having a minimum width of 6 feet (1.8 m).

There are generally two modes of fire sprinkler protection for storage occupancies. The first mode of protection is referred to as 'control mode' and the second mode of protection is referred to as 'suppression mode'. NFPA 13 defines control mode protection as "limiting the size of a fire by distribution of water so as to decrease the heat release rate and pre-wet adjacent combustibles, while controlling ceiling gas to avoid structural damage." Suppression mode protection is defined as, "sharply reducing the heat release rate ("HRR") of a fire and preventing its regrowth by means of direct and sufficient application of water through the fire plume to the burning fuel surface."

Control mode protection is meant to limit fire growth until firefighting personnel arrive with hoses that can discharge water at higher volumetric flow rates to achieve extinguishment. For example, a control mode storage fire protection sprinkler scheme may consist of fire sprinklers spaced every 10 feet (3.0 m) on center over a coverage area of 2,500 square feet (232 m$^2$). The sprinklers would be designed to flow are a minimum discharge density, which is specified in terms of flow rate in gallons or liters per minute over an area (e.g., gpm/square feet or L/min/m$^2$). The result of many smaller sized fire protection sprinklers operating over a large area may require more than 25 sprinklers discharging water simultaneously to achieve fire 'control'.

In order to be classified as 'suppression mode' the fire sprinkler protection generally consists of larger sprinklers (i.e., K-14 gpm/psi$^{1/2}$ [200 L/min/bar$^{1/2}$] or larger) with fast operating characteristics. NFPA 13 classifies this type of protection as Early Suppression Fast Response ("ESFR"). Suppression mode protection is meant to suppress or extinguish a fire and requires limited firefighter intervention. The water demand for a suppression mode protection is specified in terms of a minimum number of operating sprinklers (usually 12 or less) operating at a specific pressure. The result of the larger orifice size fire protection sprinklers operating at higher pressure, is that a fire will be suppressed with fewer sprinklers operating.

In addition to the different modes of high-pile storage fire sprinkler protection there are generally two methods of achieving either suppression or control. One method is referred to as 'ceiling only' and consists of providing fire protection sprinklers only at the ceiling above the hazard. The other method consists or providing fire protection sprinklers both at the ceiling above the storage array and embedded within the storage racking. Ceiling only, suppression mode fire sprinkler protection is the preferred protection mode and method for the following reasons:

- Fewer fire protection sprinklers need to be installed to provide adequate protection;
- Less piping and fewer fittings are required to supply the fire protection sprinkler system;
- Fire protection sprinklers are not installed in storage racking where they can be hit and damaged by material handling equipment (e.g., powered industrial trucks ("PIT") a/k/a forklifts);
- Fewer sprinklers need to activate to suppress a fire;
- Fire protection sprinkler water discharges over a smaller area results in less water damage to stored products in the facility; and
- With the fire 'suppressed' in a rapid manner, less product is damaged.

In order to qualify as a ceiling only suppression mode fire protection sprinkler, a new invention is subjected a rigorous series of tests by a listing agency such as UL. Perhaps the most important, and also the most challenging, series of tests to which a new fire protection sprinkler invention is subjected are a series of full-scale fire tests. In each full-scale fire tests, the fire protection sprinklers are located at the ceiling of a room measuring approximately 100 feet by 100 feet (30 m by 30 m) with a movable ceiling that goes up to 48 feet (14.6 m) high. A specific arrangement of storage racks with Group A plastic commodity stacked to a designated height is placed on the floor for each full-scale fire test.

For each full-scale fire test a unique ignition location is chosen to fully evaluate the fire protection sprinkler invention's performance against differing fire growth and fire suppression dynamics. For new fire sprinkler inventions designed to compete with other technology already on the market, the full-scale test series is standardized. In other words, it must pass the same series of full-scale fire tests that other fire protection sprinklers on the market have already passed. However, for new fire protection sprinkler inventions designed to achieve ceiling only suppression of fires in commodity and storage configurations that have not yet been proven, a unique series of full-scale tests is created by the listing and testing agency (i.e., UL). Passing this unique series of tests results in the listing/testing agency issuing a 'specific application' listing for the sprinkler.

There are a number of characteristics that determine the performance of a fire protection sprinkler in full-scale testing and in the real work applications. These characteristics are the orientation, orifice size or K-factor, operating element, response time index ("RTI"), frame, and deflector. Each of these characteristics is discussed in turn below.

Applicable standards recognize two orientations of storage fire protection sprinklers: upright and pendant. Upright sprinklers are intended to be installed such that the sprinkler is on top of the pipe supplying fire protection fluid (e.g., water) to it. This results in the sprinkler deflector positioned nearest to the ceiling immediately above the sprinkler. When an upright sprinkler activates, water initially discharges from the orifice in an upward direction until it makes contact with the deflector. Upright sprinklers usually have an umbrella shaped deflector that shapes and redirects the water downward into a unique 'discharge pattern' onto the protected area below. One drawback of upright storage fire protection sprinklers is the 'pipe shadow' effect. The pipe shadow effect is caused by the disruption of the sprinkler discharge pattern by the pipe supplying and immediately below the sprinkler. This phenomenon generally results in poorer performance of upright sprinklers in full-scale fire tests when compared to pendant sprinklers of an equivalent K-factor. For this reason, applicable codes and standards generally limit upright storage fire protection sprinklers to protecting comparatively less hazardous commodities under lower ceiling heights when compared to pendant sprinklers of an equivalent K-factor.

Pendant sprinklers are intended to be installed such that the sprinkler is below the pipe supplying fire protection fluid to it. This results in the sprinkler deflector positioned further from the ceiling and closer to the protected hazard below. When a pendant sprinkler activates, water discharges downward from the orifice until it makes contact with the deflector. The deflector shapes and redirects the water discharge forming a unique pattern of flowing water droplets referred to as the 'discharge pattern'. Pendant sprinklers are not subject to the aforementioned 'pipe shadow' effect since the sprinkler is located below the pipe supplying it.

The unique design of the sprinkler deflector significantly influences the performance of the fire protection sprinkler in full-scale tests.

The orifice size, or K-factor, of a storage fire protection sprinkler determines the amount of water that will flow out of the sprinkler at a given pressure. K-factor is defined mathematically as $K=Q/P^{1/2}$ where Q represents the flow rate in gallons or liters per minute (GPM or L/min, respectively) from the outlet (orifice) of the sprinkler and P represents the pressure (or force) driving the water out of the sprinkler orifice and is measured in pounds per square inch (psi) or bar.

The operating element of a storage fire protection sprinkler is what controls the flow of water from the sprinkler. Under normal conditions, the operating element holds a seal over the sprinkler orifice to prevent water from coming out. When heat from a fire is detected, the operating element triggers and allows water to flow out of the orifice. This process is not reversible; a storage fire protection sprinkler that operates must be completely replaced in the systems by a new sprinkler. There are generally two types of operating element for storage fire protection sprinkler: frangible glass bulbs, or metal fusible links. A frangible glass bulb operating element is a hermetically sealed glass tube filled with a fluid. When the glass bulb heats up the fluid expands and causes the glass bulb to rupture at a designated temperature. This in turn relieves pressure on the spring loaded orifice seal and allows water to flow freely from the sprinkler orifice. A fusible link operating element generally consists of a strut and lever connected by a metal fusible link. The fusible link itself consist of two thin sheets of metal held together by a eutectic solder. When the fusible link heats up the solder melts at a designated temperature, allowing the two pieces of metal to separate which causes the strut and lever assembly to collapse. This in turn relieves pressure on the spring loaded orifice seal and allows water to flow freely from the sprinkler orifice.

An important characteristic of a fire protection sprinklers operating element is its thermal sensitivity. Thermal sensitivity describes rate of speed at which heat is transferred to the operating element from the air via convection and the rate of speed that heat passes through the operating element's components as it heats up via conduction. The unit of measure used to describe a fire protection sprinkler's thermal sensitivity is the response time index (RTI). The unit of measure for RTI is $(m \cdot s)^{1/2}$ or $(ft \cdot s)^{1/2}$ RTI is measured using an apparatus known as a 'plunge apparatus.' A plunge apparatus consists of a heater and fan connected to a duct that circulates air in a closed loop. Instruments and controls are used to measure and regulate the temperature and velocity of the air stream within the ductwork. Once the airstream has stabilized at a predetermined temperature and velocity a fire protection sprinkler is 'plunged' into the airstream and a stopwatch is started. When the sprinkler activates the stopwatch is stopped and the time is recorded. This process is repeated numerous times and in different orientations for each new invention. The time recorded is used in the following equations to determine the RTI:

$$RTI=T^{*}u^{1/2} \quad \text{(Equation 1)}$$

in which:

$$T=-t_o/\ln[1-(T_m/(T_g-T_u)] \quad \text{(Equation 2)}$$

and:

$t_o$: Operating time of the sprinkler [s];

$T_m$: Designated temperature rating of the sprinkler [° C., ° F.];

$T_g$: Nominal gas temperature in the test section of the apparatus [° C., ° F.];

$T_u$: Nom. temperature of the sprinkler before being plunged into the apparatus [° C., ° F.]; and u: Nom. gas velocity in the test section of the apparatus [m/s, feet/s].

Applicable standards classify sprinklers according to the results of the RTI test and Equation 1. Fire protection sprinklers are classified as "ordinary response", "fast response", or "quick response". Standard response sprinklers have an RTI not less than 80 $(m \cdot s)^{1/2}$ [145 $(ft \cdot s)^{1/2}$] and not more than 350 $(m\cdot s)^{1/2}$ [630 $(ft\cdot s)^{1/2}$]. Fast response sprinklers have an RTI less than 36 $(m\cdot s)^{1/2}$ [65 $(ft\cdot s)^{1/2}$]; and quick response sprinklers have an RTI value less than 50 $(m\cdot s)^{1/2}$ [90 $(ft\cdot s)^{1/2}$]. A storage fire protection sprinkler must be classified as 'fast response' in order to meet the requirements for Early Suppression Fast Response (ESFR).

As stated previously, the sprinkler spray pattern is the unique feature of any new storage fire protection sprinkler invention that is mostly responsible for defining its performance and is what differentiates it from other prior art. The unique shape of the sprinkler deflector is what ultimately determines the characteristics of the spray pattern in terms of fluid droplet size and fluid droplet distribution, while fluid momentum and fluid flow rate are largely dictated by the orifice shape and size and operating pressure.

SUMMARY

In one embodiment, the present disclosure provides a ceiling-only fire protection sprinkler system for a storage area having a storage height up to forty-three feet (thirteen and one tenth meters) and a ceiling height exceeding forty-five feet (thirteen and seven tenths meters), the storage area having a configuration of rack storage or floor storage, the rack storage being any one or a combination of single-row, double-row, or multiple row rack storage with aisle widths less than six feet (one and eight tenths meters) and transverse flue spaces less than six inches (one hundred fifty millimeters), the floor storage being any one or a combination of solid-piled, palletized, bin-box shelf. The fire protection sprinkler system includes (A) a gridded piping network supplied by a source of fire protection fluid provided over the storage area, and (B) a plurality of fire suppression sprinklers, each of the plurality of fire suppression sprinklers being pendent suppression mode specific application fire suppression sprinklers. Each of the plurality of fire suppression sprinklers include (a) a body having (i) an inlet orifice at an input end of the body, an outer surface of the input end configured to connect to the gridded piping network, (ii) an outlet orifice at an output end of the body, and (iii) an axial fluid flow passage that extends between the outlet orifice and the inlet orifice, (b) a seal cap that seals the outlet orifice, (c) a first frame arm and a second frame arm that extend from opposite sides of the output end of the body and meet at a hub positioned downstream of the outlet orifice and extend along a fluid flow axis, the first frame arm and the second frame arm forming a plane, (d) a thermally responsive element positioned between the hub and the seal cap, the thermally responsive element being configured (1) to hold the seal cap in the outlet orifice, and (2) to release the seal cap when ambient temperature reaches a predetermined temperature, and (e) a deflector mounted to the hub, the deflector being centered on the fluid flow axis, and having a plurality of slots arrayed around a periphery of the deflector, the deflector being configured to distribute the fire protection fluid to a coverage area of the storage area. The deflector of each of the plurality of fire suppression sprinklers is positioned at a height that is at least three feet (nine tenths meters) greater than the storage height and at least one foot (three tenths meters) below the ceiling, at least one of the plurality of fire suppression sprinklers being activated in an event of a fire condition sensed by the thermally responsive element, and the fire protection fluid being delivered from the gridded piping network and output by each of the at least one activated of the plurality of fire suppression sprinklers to a coverage area greater than sixty-four square feet (five and nine tenths square meters) and up to one hundred square feet (nine and three tenths square meters) per each of the at least one activated of the plurality of fire suppression sprinklers.

In another embodiment, the present disclosure provides for a method of providing a ceiling-only fire protection sprinkler system for a storage area comprising a storage height up to forty-three feet (thirteen and one tenth meters) and a ceiling height exceeding forty-five feet (thirteen and seven tenths meters), the storage area having a configuration of rack storage or floor storage, the rack storage being any one or a combination of single-row, double-row, or multiple row rack storage with aisle widths less than six feet (one and eight tenths meters) and transverse flue spaces less than six inches (one hundred fifty millimeters), the floor storage being any one or a combination of solid-piled, palletized, bin-box shelf. The method includes (A) providing a ceiling-only fire protection sprinkler system that includes (a) a gridded piping network supplied by a source of fire protection fluid provided over the storage area, and (b) a plurality of fire suppression sprinklers, the fire suppression sprinklers being pendent suppression mode specific application fire protection sprinklers. Each of the plurality of fire suppression sprinklers includes (i) a body including (1) an inlet orifice at an input end of the body, an outer surface of the input end configured to connect to the gridded piping network, (2) an outlet orifice at an output end of the body, and (3) an axial fluid flow passage that extends between the outlet orifice and the inlet orifice, (ii) a seal cap that seals the outlet orifice, (iii) a first frame arm and a second frame arm that extend from opposite sides of the output end of the body and meet at a hub positioned downstream of the outlet orifice and extend along a fluid flow axis, the first frame arm and the second frame arm forming a plane, (d) a thermally responsive element positioned between the hub and the seal cap, the thermally responsive element being configured to (1) hold the seal cap in the outlet orifice, and (2) release the seal cap when ambient temperature reaches a predetermined temperature, and (e) a deflector mounted to the hub, the deflector being centered on the fluid flow axis, and having a plurality of slots arrayed around a periphery of the deflector, the deflector being configured to distribute the fire protection fluid to a coverage area of the storage area. The method also includes (B) installing each of the plurality of fire suppression sprinklers over the storage area so that the deflector of each of the plurality of fire suppression sprinklers is positioned at a height that is at least three feet (nine tenths meters) greater than the storage height and at least one foot (three tenths meters) below the ceiling. The installing includes (a) connecting each of the plurality of fire suppression sprinklers to the gridded piping network, (b) activating at least one of the plurality of fire suppression sprinklers in an event of a fire condition sensed by the thermally responsive element, and (c) delivering the fire protection fluid supplied to each of the plurality of fire suppression sprinklers from the gridded piping network, to be output by each of the at least one activated of the plurality of fire suppression sprinklers to a coverage area greater than sixty-four square feet (five and nine tenths square meters) and up to one hundred square feet (nine and three tenths square meters) per each of the at least one activated of the plurality of fire suppression sprinklers.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Figure 1:
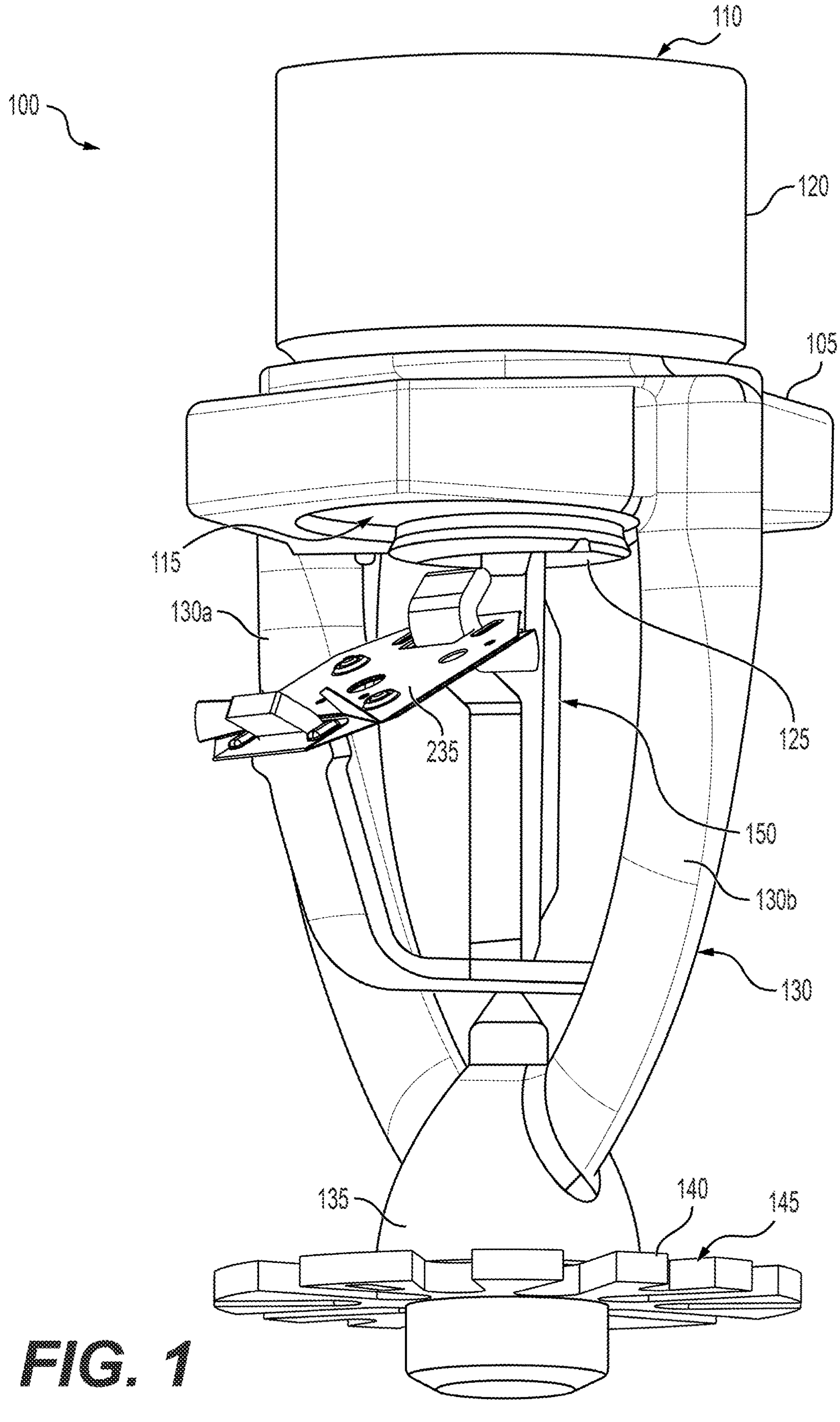
FIG. 1 is an isometric view of an example fire suppression sprinkler, according to the present disclosure.
Figure 2:
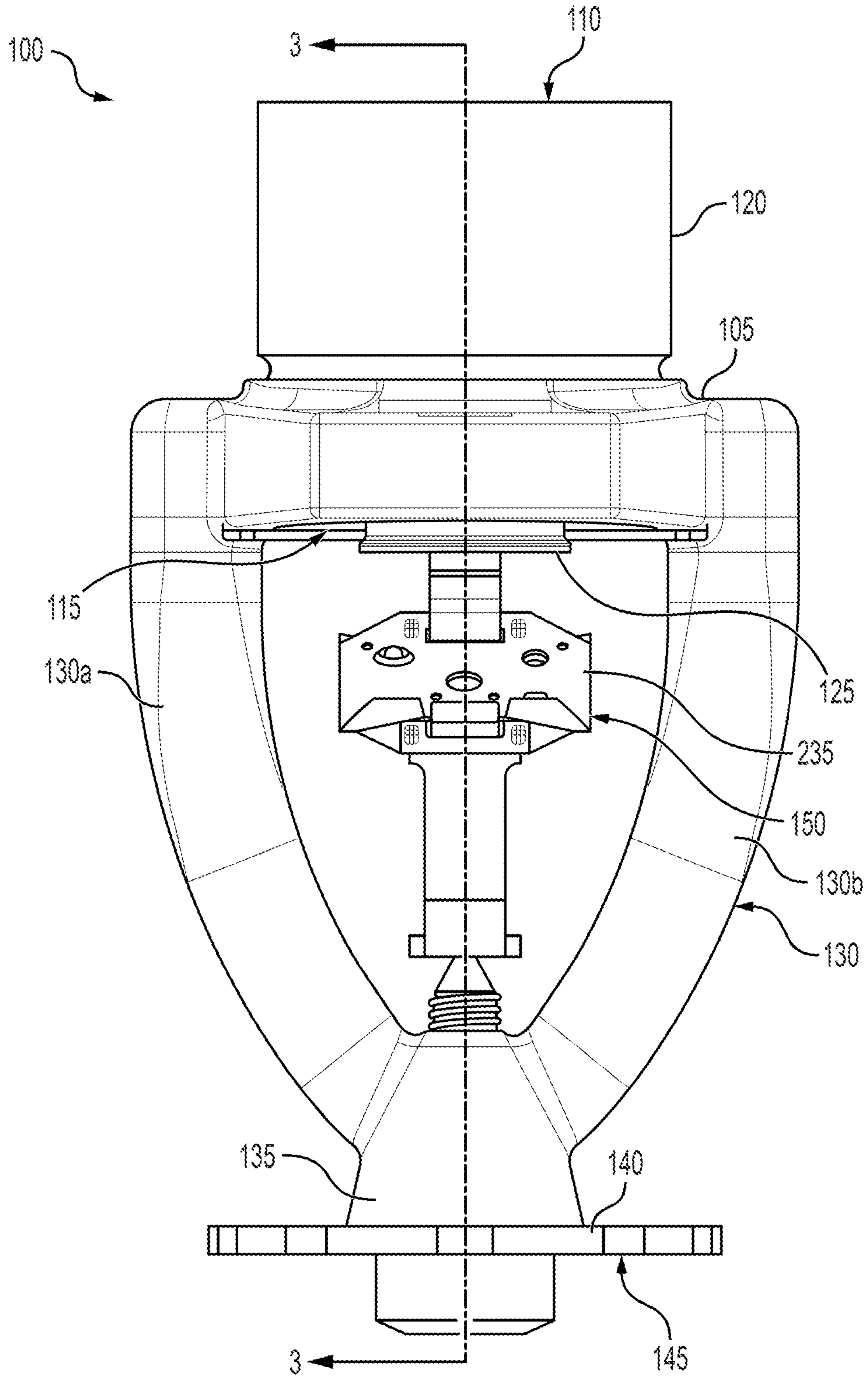
FIG. 2 is a side view of an example fire suppression sprinkler, according to the present disclosure.

Referring now to the drawings, FIG. 1 is an isometric view of an exemplary fire suppression sprinkler 100, according to the present disclosure. FIG. 2 is a side view of the fire suppression sprinkler 100, according to the present disclosure. With reference to FIGS. 1 and 2, the fire suppression sprinkler 100 is a pendant suppression mode specific application fire protection sprinkler and includes a body 105 defining an axial fluid flow passage 202 (FIG. 3) having an inlet orifice 110 and an outlet orifice 115. The top of the body 105 has a threaded portion 120 on an outer surface to allow the fire suppression sprinkler 100 to be connected to a conduit (not shown in FIG. 1) for providing a pressurized fire-extinguishing fluid, such as water, to an input end near the inlet orifice 110 of the fluid passage, as detailed further below. The outlet orifice 115 is provided at an opposite end of the fluid passage relative to the inlet orifice 110, also referred to as an output end, and is sealed by a seal cap 125. The inlet orifice 110 may have a diameter of, for example, 1 inch NPT (national pipe tapered threads) or ISO7-1R1. The fire suppression sprinkler 100 has a K-factor of, for example, 28 gpm/(psi)$^{1/2}$ or 400 L/min/bar$^{1/2}$, that, as mentioned above, is defined by $K=Q/P^{1/2}$, where Q is the flow rate in gallons per minute or Liters per minute, respectively, and P is the residual pressure at the inlet of the sprinkler in pounds per square inch or bar, respectively.

Two frame arms 130 extend from a lower portion of the body 105, and meet at a hub 135, that is positioned downstream and is in axial alignment with the outlet orifice 115. The two frame arms 130 include a first frame arm 130*a* and a second frame arm 130*b*. The first frame arm 130*a* and the second frame arm 130*b* extend from opposite sides of the output end of the body 105 and meet at the hub 135. The two frame arms 130 form a plane. A deflector 140 is positioned and mounted on the hub 135 so as to be impinged by the fluid that passes through the fluid passage upon activation of the fire suppression sprinkler 100. As further discussed below, the deflector 140 is centered on and orthogonal to a fluid flow axis of the fluid passage (e.g., the deflector 140 is perpendicular to the plane formed by the two frame arms 130). In this embodiment, the deflector 140 is a circular, planar disk. In some embodiments, the deflector 140 is non-circular. In some embodiments, the deflector 140 is non-planar. The deflector 140 has a plurality of slots 145 of varying length and orientation arrayed around a periphery of the deflector 140. A release mechanism, e.g., a fusible link assembly 150, having a thermally responsive element 235, e.g., a fusible link, is positioned between the hub 135 and the seal cap 125 to hold the seal cap 125 in place over the outlet orifice 115.

Figure 3:
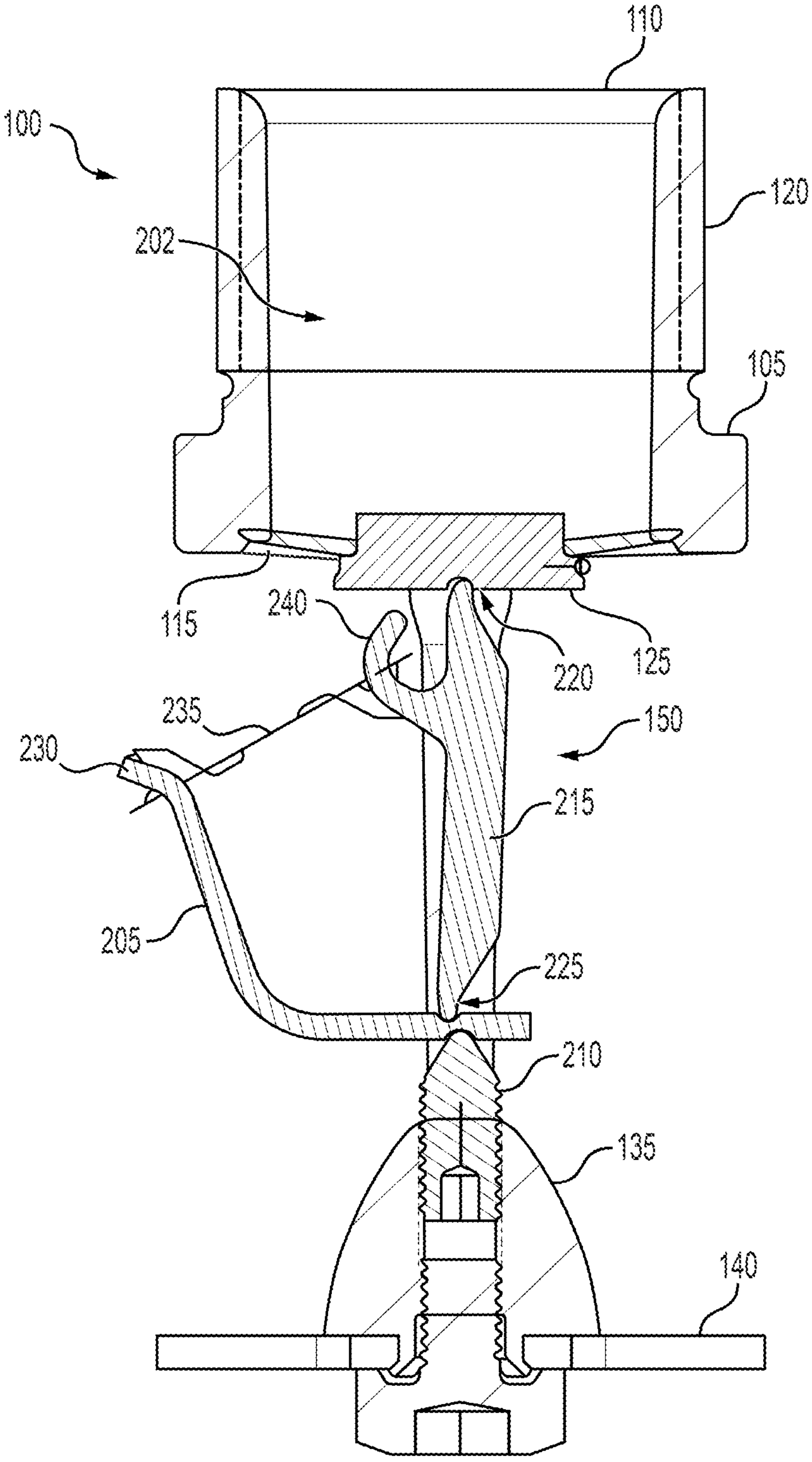
FIG. 3 is a longitudinal cross-sectional view of the fire suppression sprinkler, taken along line 3-3 FIG. 2, according to the present disclosure.

FIG. 3 is a longitudinal cross-sectional view of the fire suppression sprinkler 100, taken along line 3-3 FIG. 2, according to the present disclosure. As shown in the sectional view of FIG. 2, the fusible link assembly 150 includes a lever 205 positioned on a set screw 210 that extends upward from the hub 135. A strut 215 is positioned between the seal cap 125 and the lever 205, such that one end of the strut 215 is positioned in a slot 220 on the surface of the seal cap 125 and the other end of the strut 215 is positioned in a slot 225 on the lever 205, slightly offset from an axis of the set screw 210.

The pressure of the fluid on the seal cap 125 causes a downward force to act on the strut 215, which, in turn, causes an extended end 230 of the lever 205 to tend to rotate away from the strut 215 (e.g., the lever 205 rotates counter-clockwise in the view of FIG. 3). The rotational force on the lever 205 creates a tension force on the thermally responsive element 235 that is attached to the extended end 230 of the lever 205 and to a hook 240 provided on an upper portion of the strut 215.

The thermally responsive element 235 comprises two thin, metal plates, e.g., beryllium-nickel alloy, one connected to the lever 205 and the other connected to the strut 215. The plates are joined in an overlapping manner with solder that melts at a predetermined temperature. The thermally responsive element 235 separates at the predetermined temperature, due to the tension force applied by the lever 205 and the strut 215, allowing the lever 205 and the strut 215 to swing outward. This in turn releases the seal cap 125 and allows the fluid to be output from the outlet orifice 115. Of course, other types of release mechanisms may be used, including, but not limited to, for example, a frangible bulb or a sensor, strut, and lever assembly.

Figure 4:
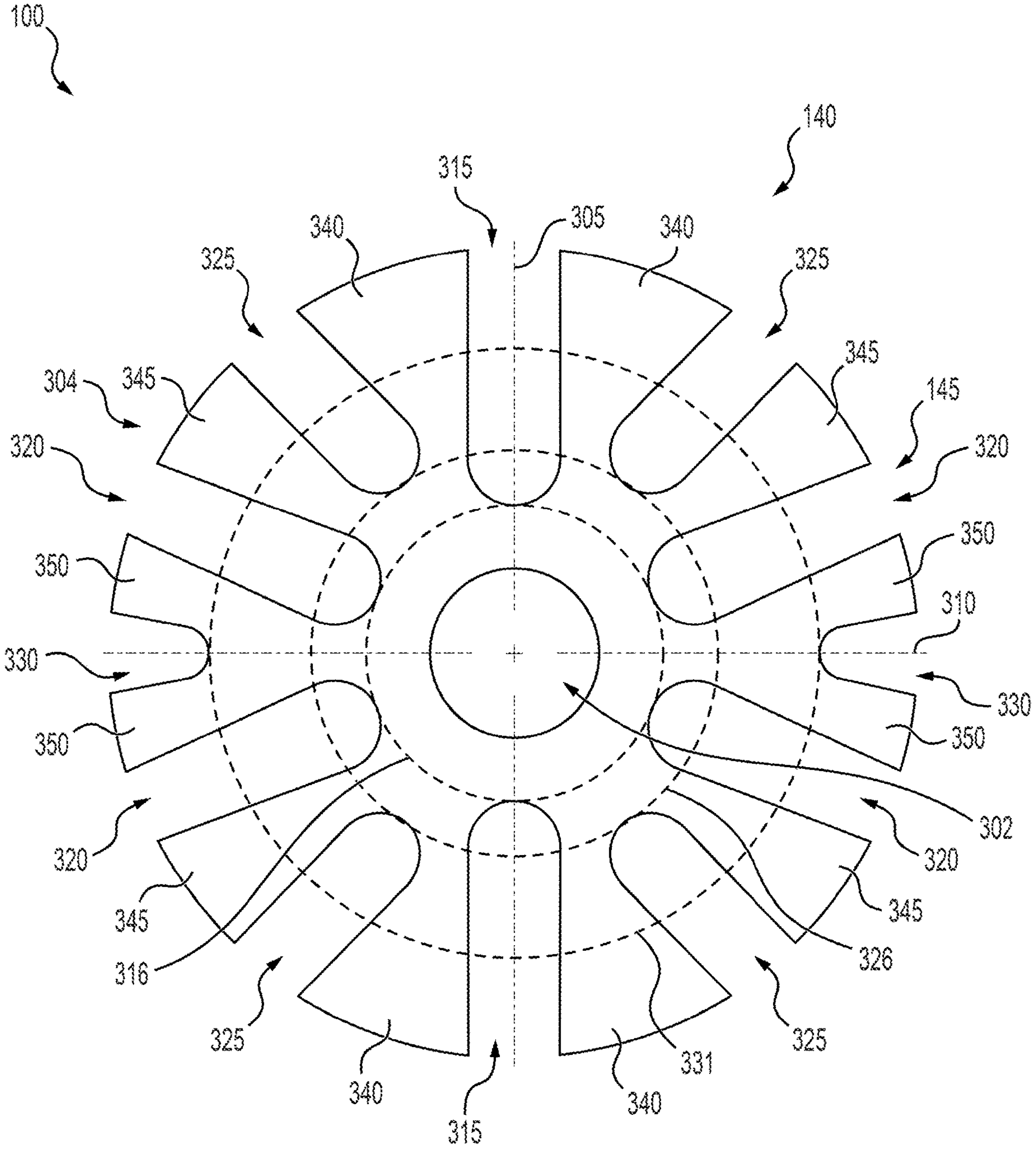
FIG. 4 is an end view of the fire suppression sprinkler shown in FIG. 1 and showing a plan view of an example deflector, according to the present disclosure.
Figure 5:
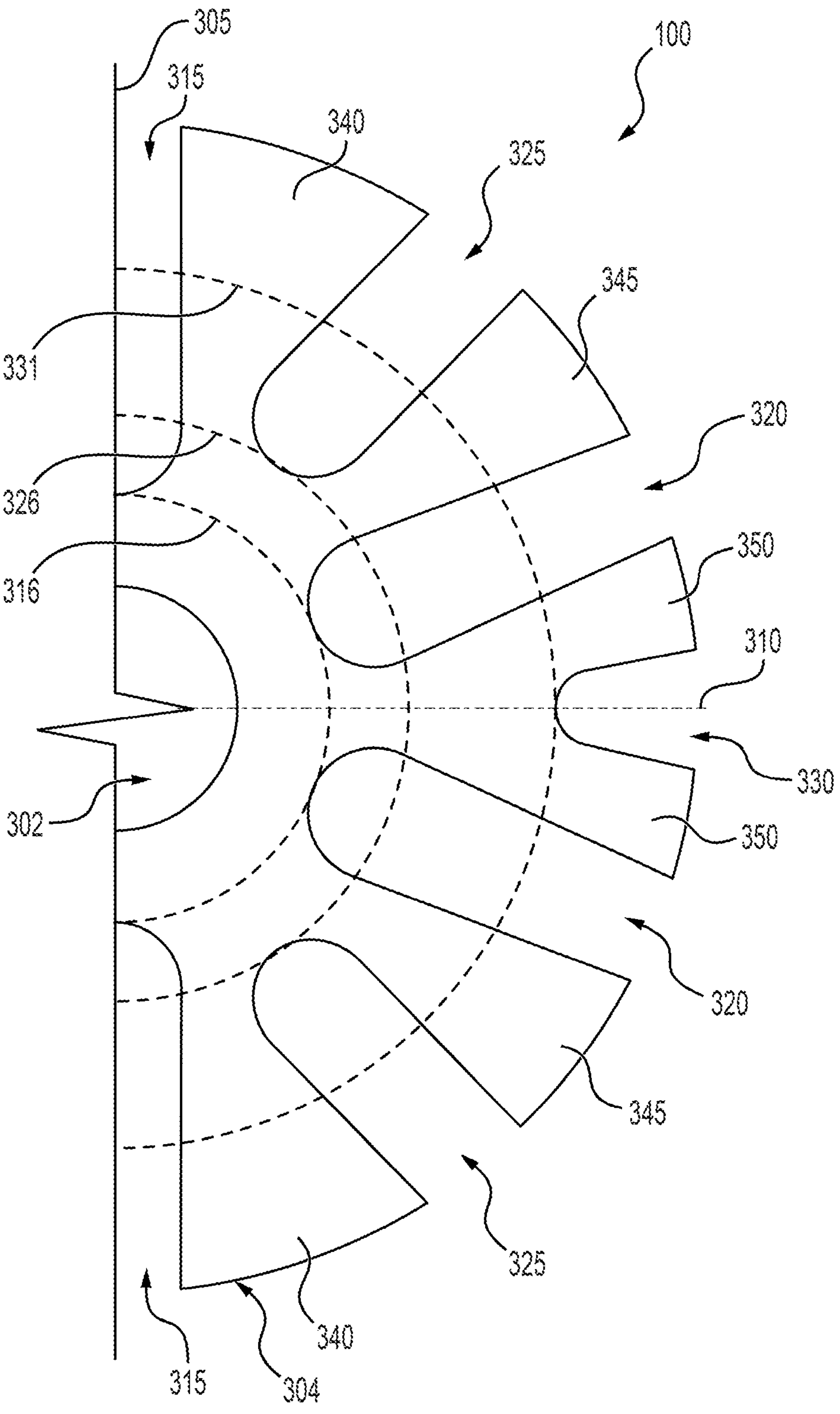
FIG. 5 is a plan view of a symmetrical half of the example deflector shown in FIG. 4, according to the present disclosure.
Figure 6:
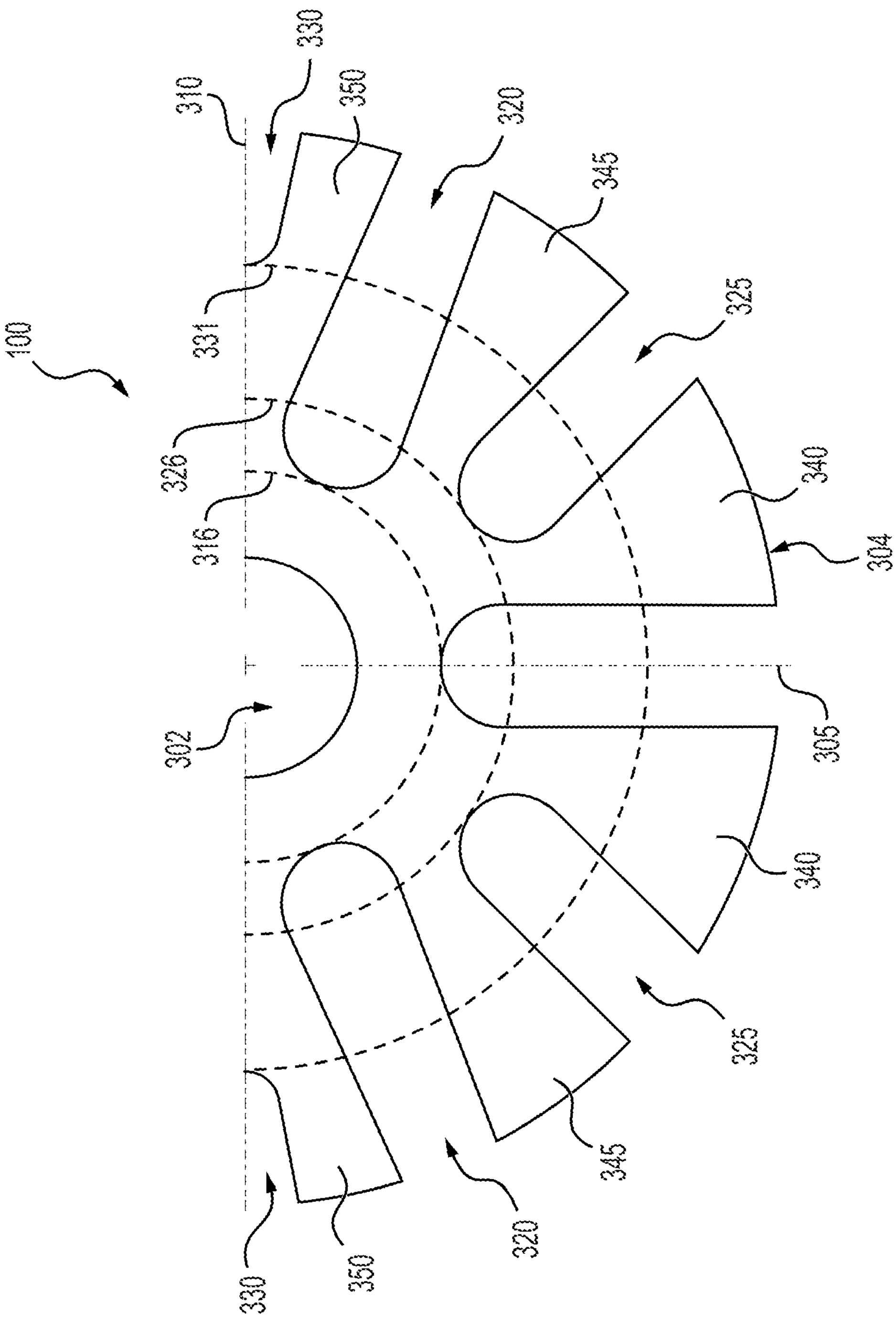
FIG. 6 is a plan view of another symmetrical half of the example deflector shown in FIG. 4, according to the present disclosure.

FIG. 4 is an end view of the fire suppression sprinkler 100 and showing a plan view of the deflector 140, according to the present disclosure. FIG. 5 is a plan view of a symmetrical half of the deflector 140, according to the present disclosure. FIG. 6 is a plan view of another symmetrical half of the deflector 140, according to the present disclosure.

As noted above, the deflector 140 has a plurality of slots of varying length and orientation arrayed around the periphery of the deflector 140. The deflector 140 may be formed, for example, of phosphor bronze and may have a desired diameter and desired thickness. In alternative embodiments, the diameter of the deflector 140 may vary by about +15%. The deflector 140 may be planar, as shown in this embodiment, or may be curved or bent (e.g., non-planar), so that an outer portion of the deflector 140 extends away from the outlet orifice 115. The deflector 140 includes a mounting hole 302 for mounting the deflector 140 to the hub 135 (FIGS. 1 to 3). The slots 145 define a plurality of tines 304 of the deflector 140, as detailed further below.

With reference to FIGS. 4 to 6, the positions of the slots 145 are described in terms of the approximate angle between each slot and a first reference line 305 extending vertically though the planar view of the deflector 140 shown in FIG. 4, and a second reference line 310 that is perpendicular to the first reference line 305 and extending horizontally through the planar view of the deflector 140 shown in FIG. 4. In the exemplary embodiment, there is a plurality of first slots 315 (the "first aligned slots") provided in an aligned configuration on the first reference line 305 so that each of the plurality of first slots 315 is opposite to the other of the plurality of first slots 315. For example, the plurality of first slots 315 include two first slots 315 that are positioned on the first reference line 305 at an angle of 180° relative to one another. Each of the plurality of first slots 315 extends to a first reference circle 316 on the deflector 140. The first reference circle 316 has a first diameter.

A plurality of second slots 320 (the "first corner slots") are each provided at about 23° from the second reference line 310. The plurality of second slots 320 include four second slots 320. Each of the plurality of second slots 320 extends to the first reference circle 316. In this way, the plurality of second slots 320 includes a radial length that is equal to a radial length of the plurality of first slots 315.

A plurality of third slots 325 (the "second corner slots") are each provided between the plurality of first slots 315 and the plurality of second slots 320. The plurality of third slots 325 include four third slots 325. Each of the plurality of third of slots 325 extends to a second reference circle 326 on the deflector 140. The second reference circle 326 has a second diameter. The second diameter is greater than the first diameter. In this way, the plurality of third slots 325 include a radial length that is less than the radial length of the plurality of first slots 315 and the plurality of second slots 320.

A plurality of fourth slots 330 (the "second aligned slots") are each provided in an aligned configuration on the second reference line 310 so that each of the plurality of fourth slots 330 is opposite to the other of the plurality of fourth slots 330. For example, the plurality of fourth slots 330 include two fourth slots 330 that are positioned on the second reference line 310 at an angle of 180° relative to one another. Each of the plurality of fourth slots 330 extends to a third reference circle 331 on the deflector 140. The third reference circle 331 has a third diameter. The third diameter is greater than the first diameter and is greater than the second diameter. In this way, the plurality of fourth slots 330 includes a radial length that is less than the radial length of the plurality of first slots 315 and the plurality of second slots 320, and less than the radial length of the plurality of third slots 325.

Each of the respective second slots 320 and each of the respective third slots 325 are positioned between each of the respective first slots 315 and each of the respective fourth slots 330. The slots 145 discussed above have rounded inner ends that are approximately semicircular, with a radius equal to half of the slot width, but other geometries may also be used. The deflector 140 may have other slots in addition to those described above.

A plurality of first tines 340 of the deflector 140 are defined by the plurality of first slots 315 and the plurality of third slots 325. For example, each first tine 340 is defined between a first slot 315 and an adjacent third slot 325. The plurality of first tines 340 includes four first tines 340. A plurality of second tines 345 of the deflector 140 are defined by the plurality of third slots 325 and the plurality of second slots 320. For example, each second tine 345 is defined between a third slot 325 and an adjacent second slot 320. The plurality of second tines 345 includes four second tines 345. A plurality of third tines 350 of the deflector 140 are defined by the plurality of second slots 320 and the plurality of fourth slots 330. For example, each third tine 350 is defined between a second slot 320 and an adjacent fourth slot 330. The plurality of third tines 350 includes four third tines 350.

The slots 315, 320, 325, and 330 have a closed end near the center of the deflector 140 and an open end at the perimeter of the deflector 140. The fourth slots 330 are oriented so that the plane through the frame arms 130 passes through the center of the fourth slots 330. Each of the fourth slots 330 has a variable width that is smaller near the closed end of the fourth slots 330 and increasingly larger to the open end of the fourth slots 330. The fourth slots 330 are adjacent to two second slots 320. Each of the second slots 320 has a variable width that is radiused at the closed end of the second slots 320 and then continually decreases in width towards the open end of the second slots 320. Each of the first slots 315 is radiused at the closed end of the first slots 315 and then a constant width from the end of the radius to the open end of the first slots 315. The first slots 315 are oriented so that a plane (e.g., along the first reference line 305) through the first slots 315 is perpendicular to a plane (e.g., along the second reference line 310) through the fourth slots 330. Each of the first slots 315 is adjacent to two third slots 325. The third slots 325 are non-radial slots where a plane through a center of the third slots 325 does not bisect the center of the deflector 140.

When the deflector 140 is mounted to the hub 135 (FIGS. 1 to 3) of the fire suppression sprinkler 100, and the fluid is supplied from the fluid supply to the piping network, and through the outlet orifice 115, some of the fluid flows downward through the slots 315, 320, 325, 330, and some of the fluid is redirected by the tines 340, 345, 350 of the deflector 140 in outward and upward directions. By this arrangement, the fluid can be sprayed in a generally circular spray pattern to an area below the fire suppression sprinkler 100.

Figure 7:
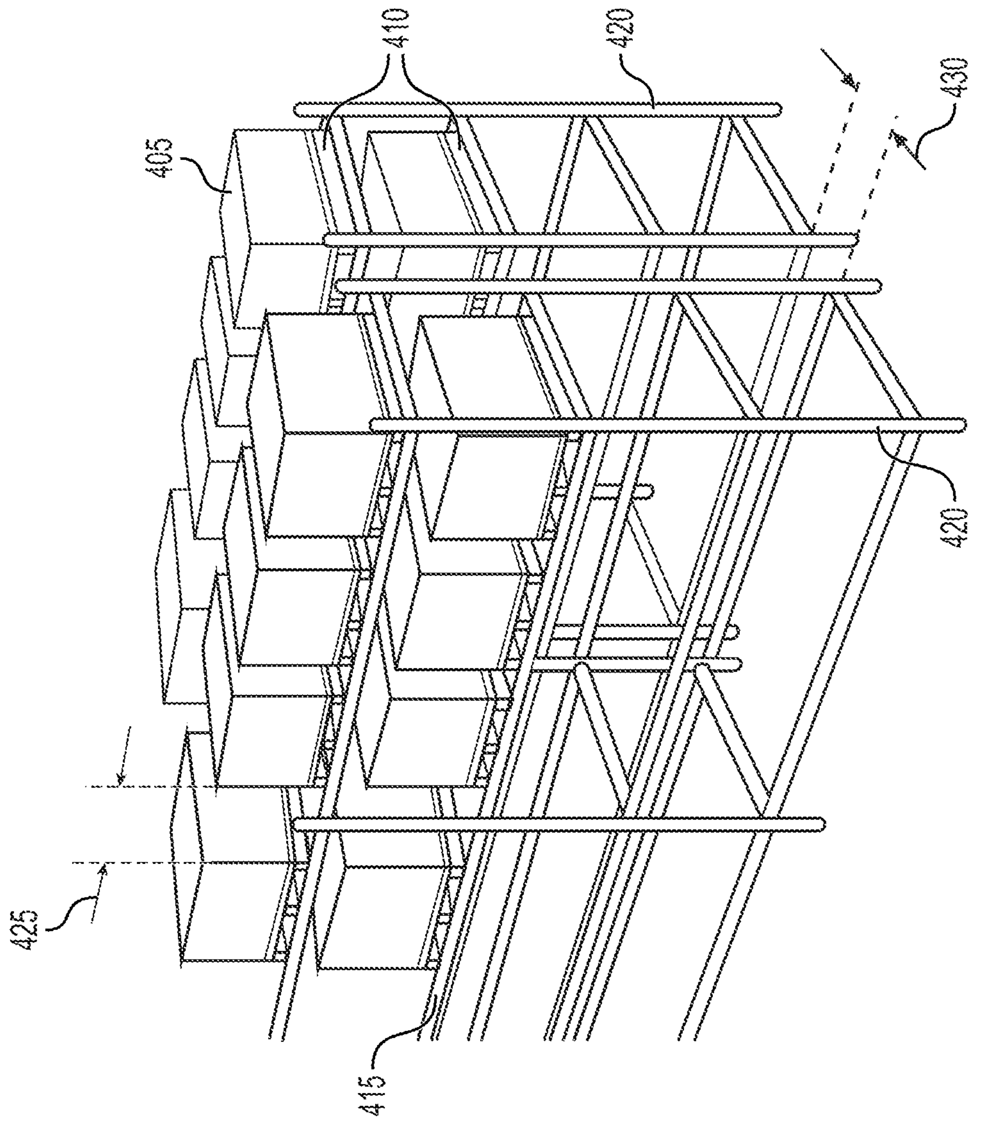
FIG. 7 is a perspective view of an arrangement of stored commodities, according to the present disclosure.
Figure 8:
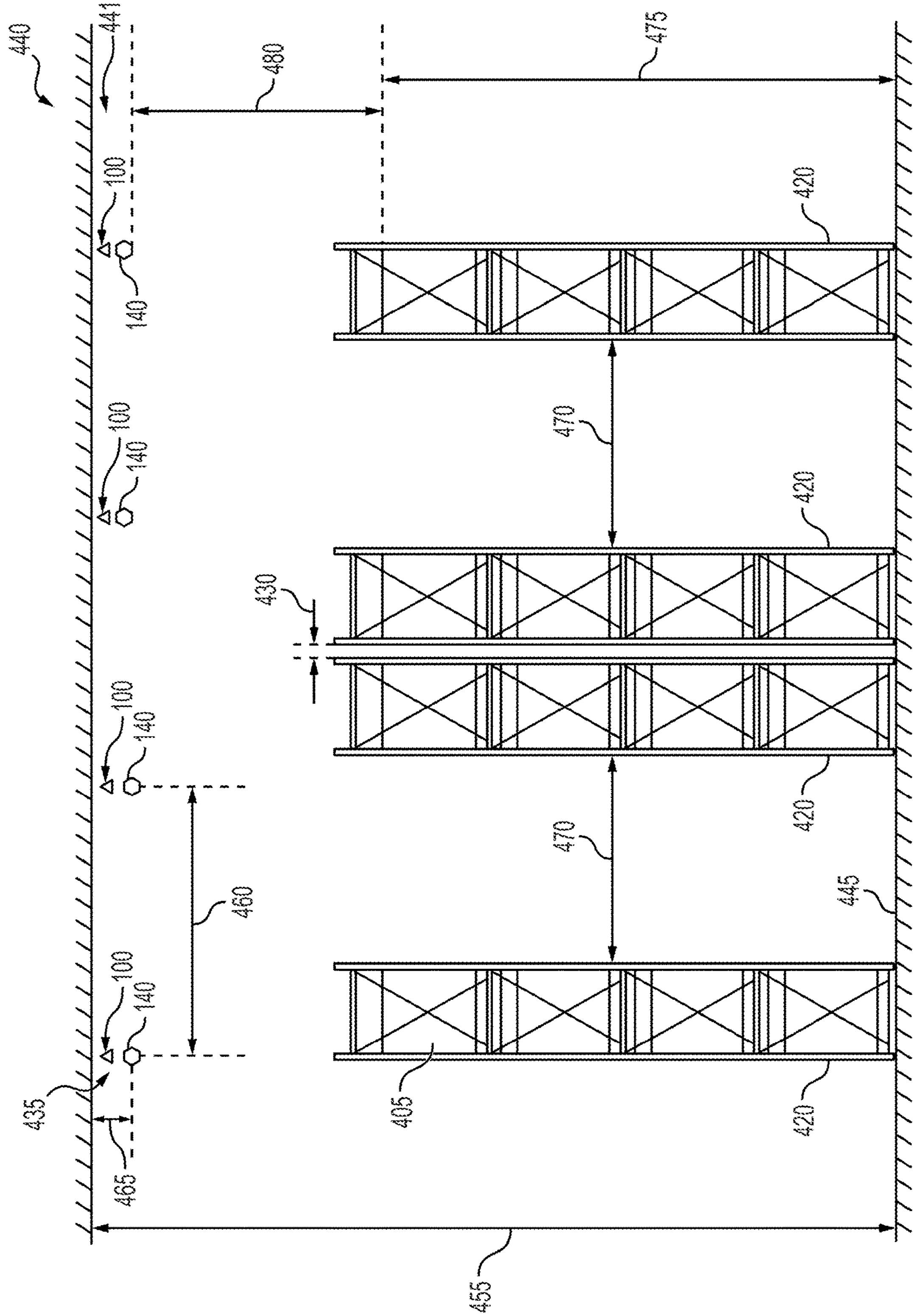
FIG. 8 is an end view of the arrangement of stored commodities shown in FIG. 7, according to the present disclosure.

FIG. 7 is a perspective view of an arrangement of stored commodities 405, according to the present disclosure. FIG. 8 is an end view of the arrangement of stored commodities 405 shown in FIG. 7, according to the present disclosure. Rack storage is a conventional storage arrangement used in various industries and facilities, as detailed above. Typically, a commodity 405 to be protected is placed on a pallet 410 and the commodity 405 and the pallet 410 are stored together on a shelf 415 in a rack 420, as shown in FIG. 7.

Racks can be single row, double row, or multiple row, with or without solid shelving. The terms "single row," "double row," and "multiple row" refer to the depth of the rack configuration in terms of the number of pallets that can be stored back-to-back. For example, a double row rack has a depth that can accommodate two pallets back-to-back, as shown in FIG. 7. When the commodities 405 are stored apart from one another in the racks 420, the spaces formed between the commodities 405 form a transverse flue space 425, as shown in FIG. 7. The transverse flue space 425 is less than four inches (4 in.) or one hundred millimeters (100 mm). In some examples, the transverse flue space 425 is three inches (3 in.) or seventy-five millimeters (75 mm). Also, the vertical spaces between adjoining racks 420 (i.e., the spaces between the backs of rows of storage) form what are known as longitudinal, or vertical flue spaces 430.

As mentioned above, NFPA 13 requires flue spaces that are a minimum of 6 in. (150 mm) wide to allow adequate water from the sprinklers at the ceiling to reach the bottom of the stored commodity in order to control or suppress a fire. FM 8-9 requires flue spaces that are a minimum of either 3 in. (75 mm) or 6 in. (150 mm) wide depending on the horizontal spacing of the flue spaces and whether the flue spaces are aligned over the height of the rack. Regardless of the flue spaces width, for ceiling heights exceeding forty feet where in-rack sprinklers are not provided, FM Data Sheet 8-9 requires aisles between racks that are a minimum of 6 ft (1.8 m) in width. The embodiments of the present disclosure comprise the combination of a narrower flue space of 4 in. (100 mm) or less with a ceiling height exceeding 40 ft (12.0 m) and an aisle width of less than 6 ft (1.8 m) with ceiling-only (no in-rack sprinklers) sprinkler protection. The combination of these factors allows for an increased density of storage in a building, thereby more commodity to be stored in a given area of building space.

With reference to FIG. 8, a ceiling-only fire protection sprinkler system 435 includes the fire suppression sprinklers 100 placed within a room, also referred to as a storage area 440, with a floor 445 and a ceiling 450. The ceiling-only fire protection sprinkler system 435 includes a plurality of fire suppression sprinklers 100 connected to a gridded piping network 441. The ceiling 450 includes a ceiling height 455 from the floor 445 to the ceiling 450 of up to forty-eight feet (48 ft.) or fourteen and six tenths meters (14.6 m). A taller ceiling height 455 can delay the operation of the fire suppression sprinklers 100 at the ceiling 450 and allow a fire to grow for longer until the fire suppression sprinklers 100 begin to operate, thereby being more challenging for fire suppression or control. However, a taller ceiling height 455 also allows for more space for the storage of commodities and for the roof to be sloped for drainage. The combination of flue space width (e.g., transverse flue space 425), aisle width (e.g., aisle 470_, and deflector to ceiling distance (e.g., deflector-to-ceiling clearance 465), with the storage height 475 and the ceiling height 455 provides the benefit of a high amount of storage materials in the space, which is more cost effective than storing less materials in a given amount of space, while allowing the present ceiling-only fire protection sprinkler system 435 to suppress or to control a fire in the storage area 440. In some examples, the ceiling height 455 is forty-seven feet and two inches (47 ft., 2 in.) or fourteen and four tenths meters (14.4 m). The fire suppression sprinklers 100 are spaced from each other at a sprinkler spacing 460 of ten feet by ten feet (10 ft.×10 ft.) or three and one tenth meters by three and one tenth meters (3.1 m×3.1 m). The deflector 140 of each fire suppression sprinkler 100 is spaced from the ceiling 450 by a deflector-to-ceiling clearance 465 of not more than fourteen inches (14 in.) or three hundred fifty millimeters (350 mm). The racks 420 are spaced by aisles 470 having an aisle width of less than six feet (6 ft.) or one and eight tenths meters (1.8 m). In some examples, the racks 420 are spaced by aisles 470 having an aisle width of four feet (4 ft.) or one and two tenths meters (1.2 m). The commodities 405 can also be stored in the storage area 440 in a floor storage arrangement including any one or a combination of solid-piled, palletized, or bin-box shelf.

The racks 420 have a storage height 475 that is a maximum of up to forty-three feet (43 ft.) or thirteen and one tenth meters (13.1 m) from the floor 445 to a top of the commodities 405 stored on the racks 420. In some examples, the storage height 475 is thirty-eight feet (38 ft.) or eleven and six tenths meters (11.6 m). In some examples, the storage height 475 is twenty-eight feet (28 ft.) or eight and five tenths meters (8.5 m). In some examples, the storage height 475 is up to and including thirty-five feet (35 ft.) or ten and seven tenths meters (10.7 m) and the ceiling height 455 is up to and including forty feet (40 ft.) or twelve and two tenths meters (12.2 m). In some examples, the storage height 475 is up to and including forty feet (40 ft.) or twelve and two tenths meters (12.2 m), and the ceiling height 455 is up to and including forty-five feet (45 ft.) or thirteen and seven tenths meters (13.7 m). In some examples, the storage height 475 is up to and including forty-three feet (43 ft.) or thirteen and one tenth meters (13.1 m), and the ceiling height 455 is up to and including forty-eight feet (48 ft.) or fourteen and six tenths meters (14.6 m). In some examples, the storage height 475 is up to and including forty-five feet (45 ft.) or thirteen and seven tenths meters (13.7 m), and the ceiling height 455 is up to and including fifty feet (50 ft.) or fifteen and two tenths meters (15.2 m). In some examples, the storage height 475 is up to and including fifty feet (50 ft.) or fifteen and two tenths meters (15.2 m), and the ceiling height 455 is up to and including fifty-five feet (55 ft.) or sixteen and eight tenths meters (16.8 m). The storage height 475 and the ceiling height 455 will be modified to meet the application. The ceiling-only fire protection sprinkler system 435 has been evaluated using a range of storage heights 475 and ceiling heights 455 to validate the effectiveness of the ceiling-only fire protection sprinkler system 435. Results of the evaluation are reproduced in Table 1 below.

The racks 420 include a deflector-to-commodity clearance 480 from the top of the commodities 405 to the deflector 140 of each fire suppression sprinkler 100 of up to twenty feet (20 ft.) or six and one tenth meters (6.1 m). In some examples, the deflector-to-commodity clearance 480 is ten feet (10 ft.) or three and one tenth meter (3.1 m). In some examples, the deflector-to-commodity clearance 480 is at least three feet (3 ft.) or nine tenths meters (0.9 m). The deflector-to-commodity clearance 480 can affect the activation of the ceiling-only fire protection sprinkler system 435 as well of the horizontal spread of fire at the time of activation. In some instances a smaller deflector-to-commodity clearance 480 makes it more difficult for a ceiling-only fire protection sprinkler system 435 to control or to suppress a fire in the commodities 405 below. Whereas in other instances a larger deflector-to-commodity clearance 480 can make it more difficult for a ceiling-only fire protection sprinkler system 435 to control or to suppress a fire examples, the discharge pressure of the fluid from the fire suppression sprinkler 100 is thirty-five pounds per square inch (35 psi) or two and fourth tenths bar (2.4 bar).

In operation, at least one of the plurality of fire suppression sprinklers 100 is activated in the event of a fire condition sensed by the thermally responsive element 235 (FIGS. 1 to 3). The fire protection fluid is delivered from the gridded piping network 441 and output by each of the at least one activated of the plurality of fire suppression sprinklers 100 to a coverage area. The coverage area is greater than sixty-four square feet (64 sq ft.) or five and nine tenths square meters (5.9 $m^2$) and is up to one hundred square feet (100 sq ft.) or nine and three tenths square meters (9.3 $m^2$) per each of the at least one activated of the plurality of fire suppression sprinklers 100.

Tests for the fire suppression sprinkler 100 were conducted under various conditions. The tests are summarized in Table 1 below.

TABLE 1

| TEST NUMBER | 1 | 2 | 3 | 4 | 5 | 6 |
|---|---|---|---|---|---|---|
| Storage Type | Double Row Rack | Double Row Rack | Double Row Rack | Double Row Rack | Double Row Rack | Double Row Rack |
| Commodity Type | Group A | Group A | Group A | Group A | Group A | Group A |
| Nominal Storage Height, ft (m) | 43 (13.1) | 38 (11.6) | 38 (11.6) | 28 (8.5) | 28 (8.5) | 38 (11.6) |
| Nominal Ceiling Height, ft (m) | 47'-2" (14.4) | 48 (14.6) | 48 (14.6) | 48 (14.6) | 48 (14.6) | 48 (14.6) |
| Nominal Clearance Deflector to Commodity, ft (m) | 3 (0.9) | 10 (3.1) | 10 (3.1) | 20 (6.1) | 20 (6.1) | 10 (3.1) |
| Transverse Flue Space, inches (mm) | 6 (150 mm) | 6 (150 mm) | 6 (150 mm) | 6 (150 mm) | 3 (75 mm) | 3 (75 mm) |
| Longitudinal Flue Space, inches (mm) | 6 (150 mm) | 6 (150 mm) | 6 (150 mm) | 6 (150 mm) | 6 (150 mm) | 6 (150 mm) |
| Ignition Location | Between 4, Offset | Between 2, Offset | Under 1, Offset | Between 4, Offset | Between 4, Offset | Under 1 |
| Temperature Rating, ° F. (° C.) | 212 (100) | 212 (100) | 212 (100) | 212 (100) | 212 (100) | 212 (100) |
| Deflector to Ceiling, inches (mm) | 14 (350) | 14 (350) | 14 (350) | 14 (350) | 14 (350) | 14 (350) |
| Nominal Sprinkler Discharge Coefficient K, gpm/psi$^{1/2}$, (L/min/bar$^{1/2}$) | 28 (400) | 28 (400) | 28 (400) | 28 (400) | 28 (400) | 28 (400) |
| Nominal Discharge Pressure, psi (bar) | 35 (2.4) | 35 (2.4) | 35 (2.4) | 35 (2.4) | 35 (2.4) | 35 (2.4) |
| Nominal Discharge Density, gpm/ft$^2$ (L/min/m$^2$) | 1.66 (67.6) | 1.66 (67.6) | 1.66 (67.6) | 1.66 (67.6) | 1.66 (67.6) | 1.66 (67.6) |
| Aisle Width, ft (m) | 4 (1.2) | 4 (1.2) | 4 (1.2) | 4 (1.2) | 4 (1.2) | 4 (1.2) |
| Sprinkler Spacing, ft × ft (m × m) | 10 × 10 (3.1 × 3.1) | 10 × 10 (3.1 × 3.1) | 10 × 10 (3.1 × 3.1) | 10 × 10 (3.1 × 3.1) | 10 × 10 (3.1 × 3.1) | 10 × 10 (3.1 × 3.1) |
| Length of Test (min:ss) | 32:00 | 32:00 | 32:00 | 32:00 | 32:00 | 31:00 |
| First Ceiling Sprinkler Operation (min:ss) | 1:30 | 1:31 | 1:10 | 1:26 | 1:42 | 0:46 |
| Last Ceiling Sprinkler Operation (min:ss) | 2:02 | 1:31 | 1:10 | 3:45 | 1:44 | 0:46 |
| Number of Operated Ceiling Sprinklers | 8 | 1 | 1 | 7 | 4 | 1 |
| Maximum 1 Minute Average Steel Temperature Above Ignition, ° F. (° C.) | 172 (77.8) | 91 (32.8) | 84 (28.9) | 127 (52.8) | 91 (32.8) | 79 (26.1) |
| Sustained Combustion at Outer Edges of target Array | NO | NO | NO | NO | NO | NO |
| Fire Spread to Rack Extremities | NO | NO | NO | NO | NO | NO |

in the commodities 405 below. A range of deflector-to-commodity clearances 420 were tested with the ceiling-only fire protection sprinkler system 435 to allow flexibility in application of the ceiling-only fire protection sprinkler system 435 to protect a variety of storage heights 475 and ceiling heights 455. The activation temperature of the fire suppression sprinkler 100 is two hundred twelve degrees Fahrenheit (212° F.) or one hundred degrees Celsius)(100° C. The discharge pressure of the fluid from the fire suppression sprinkler 100 is less than forty pounds per square inch (40 psi) or two and eight tenths bar (2.8 bar). In some Although the foregoing description is directed to the preferred embodiments of the present disclosure, other variations and modifications will be apparent to one with skill in the art that the storage fire protection sprinkler of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention. Moreover, features described in connection with one embodiment of the present disclosure may be used in conjunction with other embodiments, even if not explicitly stated above.

The invention claimed is:

1. A ceiling-only fire protection sprinkler system for a storage area comprising a storage height up to forty-three feet (thirteen and one tenth meters) and a ceiling height exceeding forty-five feet (thirteen and seven tenths meters), the storage area having a configuration of rack storage or floor storage, the rack storage being any one or a combination of single-row, double-row, or multiple row rack storage with aisle widths less than six feet (one and eight tenths meters) and transverse flue spaces less than six inches (one hundred fifty millimeters), the floor storage being any one or a combination of solid-piled, palletized, or bin-box shelf, the ceiling-only fire protection sprinkler system comprising:

(A) a gridded piping network supplied by a source of fire protection fluid provided over the storage area; and (B) a plurality of fire suppression sprinklers, each of the plurality of fire suppression sprinklers being pendent suppression mode specific application fire suppression sprinklers, each of the plurality of fire suppression sprinklers including:

(a) a body including:

(i) an inlet orifice at an input end of the body, an outer surface of the input end configured to connect to the gridded piping network;

(ii) an outlet orifice at an output end of the body; and (iii) an axial fluid flow passage that extends between the outlet orifice and the inlet orifice;

(b) a seal cap that seals the outlet orifice;

(c) a first frame arm and a second frame arm that extend from opposite sides of the output end of the body and meet at a hub positioned downstream of the outlet orifice and extend along a fluid flow axis, the first frame arm and the second frame arm forming a plane;

(d) a thermally responsive element positioned between the hub and the seal cap, the thermally responsive element being configured to (1) hold the seal cap in the outlet orifice, and (2) release the seal cap when ambient temperature reaches a predetermined temperature; and (e) a deflector mounted to the hub, the deflector being centered on the fluid flow axis, and having a plurality of slots arrayed around a periphery of the deflector, the deflector being configured to distribute the fire protection fluid to a coverage area of the storage area, wherein the deflector of each of the plurality of fire suppression sprinklers is positioned at a height that is at least three feet (nine tenths meters) greater than the storage height and at least one foot (three tenths meters) below the ceiling, at least one of the plurality of fire suppression sprinklers being activated in an event of a fire condition sensed by the thermally responsive element, and the fire protection fluid being delivered from the gridded piping network and output by each of the at least one activated of the plurality of fire suppression sprinklers to a coverage area greater than sixty-four square feet (five and nine tenths square meters) and up to one hundred square feet (nine and three tenths square meters) per each of the at least one activated of the plurality of fire suppression sprinklers, wherein the deflector of each of the plurality of fire suppression sprinklers includes a plurality of first slots, a plurality of second slots, a plurality of third slots, and a plurality of fourth slots, each of the plurality of first slots and each of the plurality of second slots extends to a first reference circle on the deflector having a first diameter, each of the plurality of third slots extends to a second reference circle on the deflector having a second diameter, and each of the plurality fourth slots extends to a third reference circle on the deflector having a third diameter, the third diameter being greater than the second diameter, and the second diameter being greater than the first diameter, and wherein the deflector of each of the plurality of fire suppression sprinklers includes a first reference line and a second reference line that is perpendicular to the first reference line, and the deflector comprises:

(i) the plurality of first slots that are each positioned on the first reference line at an angle of 180° relative to one another on the deflector;

(ii) the plurality of second slots that are each positioned at about 23° from the second reference line;

(iii) the plurality of third slots that are each positioned between the respective plurality of first slots and the respective plurality of second slots; and (iv) the plurality of fourth slots that are each positioned on the second reference line at an angle of 180° relative to one another on the deflector.

2. The ceiling-only fire protection sprinkler system of claim 1, wherein the ceiling height is up to and including forty-eight feet (fourteen and six tenths meters).

3. The ceiling-only fire protection sprinkler system of claim 1, wherein the ceiling height is up to and including fifty feet (fifteen and two tenths meters).

4. The ceiling-only fire protection sprinkler system of claim 1, wherein the storage height is up to and including forty-three feet (thirteen and one tenth meters), and the ceiling height is up to and including forty-eight feet (fourteen and six tenths meters).

5. The ceiling-only fire protection sprinkler system of claim 1, wherein the storage height is up to and including forty-five feet (thirteen and seven tenths meters), and the ceiling height is up to and including fifty feet (fifteen and two tenths meters).

6. The ceiling-only fire protection sprinkler system of claim 1, wherein the storage height is up to and including fifty feet (fifteen and two tenths meters), and the ceiling height is up to and including fifty-five feet (sixteen and eight tenths meters).

7. The ceiling-only fire protection sprinkler system of claim 1, wherein the storage height is up to and including forty-eight feet (fourteen and six tenths meters).

8. The ceiling-only fire protection sprinkler system of claim 1, wherein the aisle widths are four feet (one and two tenths meters).

9. The ceiling-only fire protection sprinkler system of claim 1, wherein the transverse flue spaces are less than four inches (one hundred millimeters).

10. The ceiling-only fire protection sprinkler system of claim 1, wherein the transverse flue spaces are three inches (seventy-five millimeters).

11. The ceiling-only fire protection sprinkler system of claim 1, wherein a pressure of the fire protection fluid output from the at least one activated of the plurality of fire suppression sprinklers is less than forty pounds per square inch (psi) (two and eight tenths bar).

12. The ceiling-only fire protection sprinkler system of claim 1, wherein a pressure of the fire protection fluid output from the at least one activated of the plurality of fire suppression sprinklers is thirty-five pounds per square inch (psi) (two and four tenths bar).

13. The ceiling-only fire protection sprinkler system of claim 1, wherein the storage area includes any one of Class I to IV and Group A cartoned unexpanded plastics commodities.

14. The ceiling-only fire protection sprinkler system of claim 1, wherein each of the plurality of fire suppression sprinklers has a K-factor of 28 gpm/(psi)$^{1/2}$ or 400 L/min/bar$^{1/2}$.

15. The ceiling-only fire protection sprinkler system of claim 1, wherein the deflector of each of the plurality of fire suppression sprinklers comprises:

(i) a plurality of first tines that are defined by the plurality of first slots and the plurality of third slots;

(ii) a plurality of second tines that are defined by the plurality of third slots and the plurality of second slots; and (iii) a plurality of third tines that are defined by the plurality of second slots and the plurality of fourth slots.

* * * * *